May 6, 1969
P. PELLI
3,442,414
COMPACT
Filed Sept. 29, 1967
Sheet 1 of 2
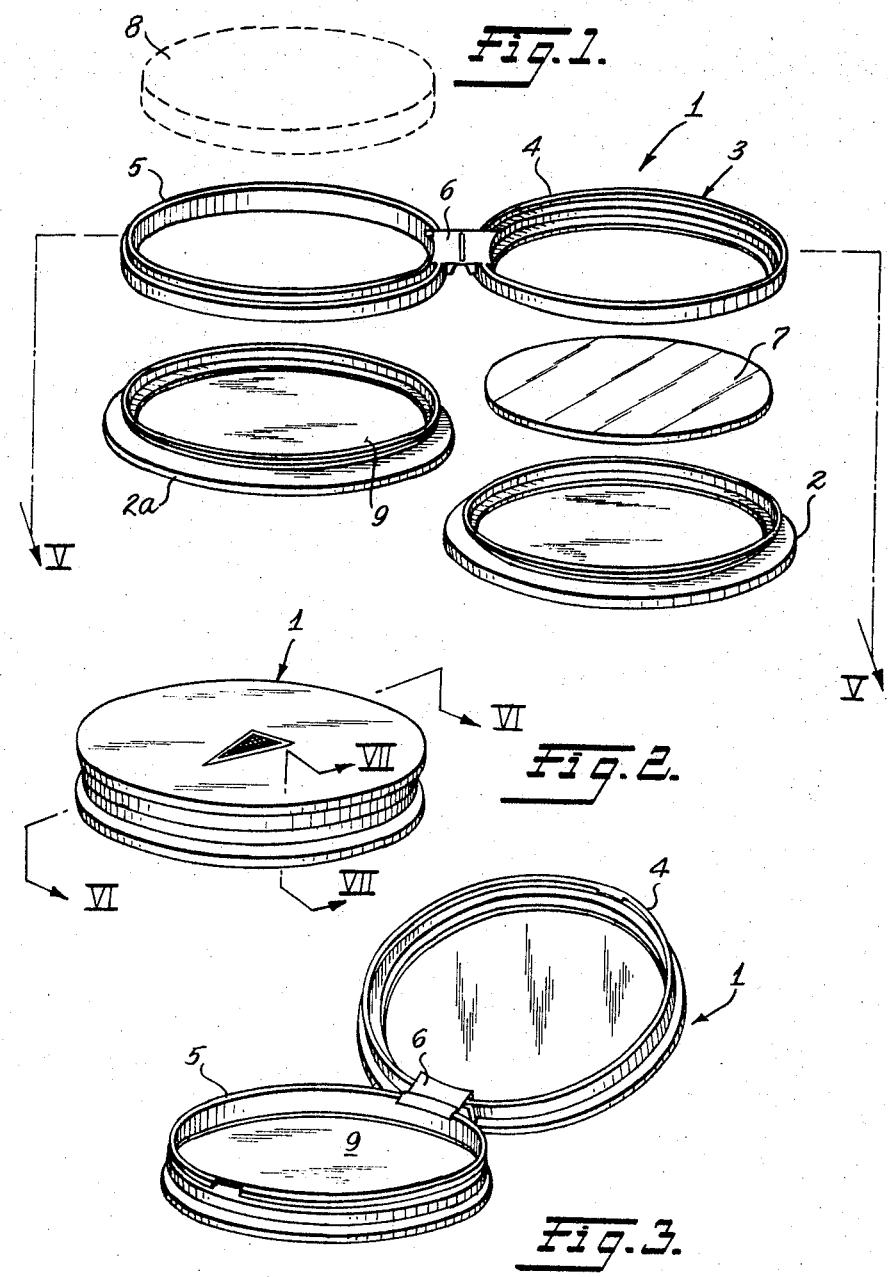
INVENTOR.
PIERRE PELLI
BY
Holcombe, Wetherill & Brisebois
ATTORNEYS

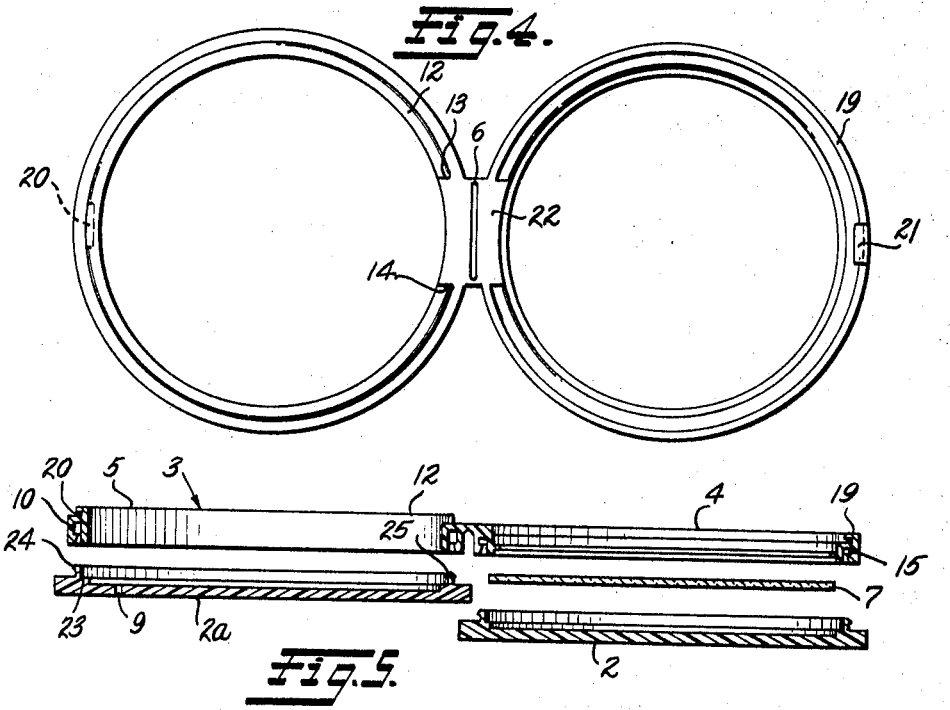
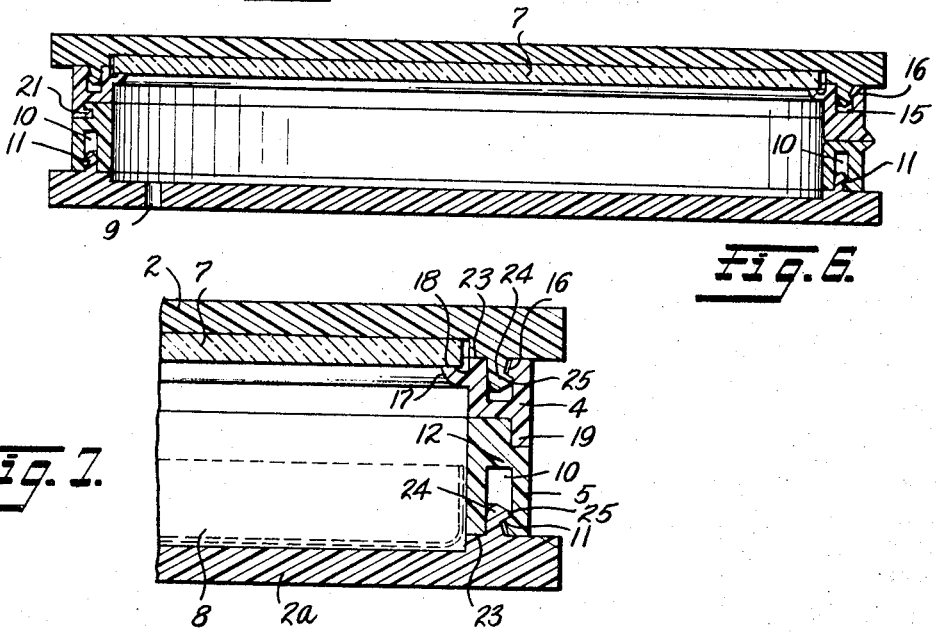

United States Patent Office 3,442,414
Patented May 6, 1969

3,442,414
COMPACT
Pierre Pelli, Paris, France, assignor to
L'Oreal, Paris, France
Filed Sept. 29, 1967, Ser. No. 671,713
Claims priority, application France, Oct. 13, 1966,
79,919
Int. Cl. B65d 43/16; A45c 15/04
U.S. Cl. 220—31      6 Claims

ABSTRACT OF THE DISCLOSURE

A compact comprising a central member moulded in one piece from resilient material and comprising upper and lower portions integrally hinged to each other and encircling a central opening, and a relatively rigid top and bottom snap-fastened to said upper and lower portions respectively.

---

The invention relates to boxes and like containers consisting of molded components preferably made of a plastic material.

The molded components of such presently used boxes are assembled in any known manner, for example by being fastened together with glue or connecting members in any suitable way.

The object of the present invention is to provide methods for assembling the molded components of the boxes without using any means other than those forming part of the components themselves.

Another object of the present invention is to provide a new article of manufacture consisting of a box or like container comprising molded components assembled without using other members or methods of connection, essentially characterized by the fact that it comprises in combination: a middle part made of a somewhat rigid material and carrying two similarly shaped trays connected by an elastic hinge, the whole middle part being molded in one step; resilient sockets on the edges of the middle part consisting of expansible grooves and cooperating ridges on the trays constituting the top and bottom of the box, said trays being made of a more rigid material than that of which the middle portion is made, said middle portion being stiffened by its assembly with the top and bottom of the box.

In order that the invention may be better understood, one embodiment thereof will now be described, purely by way of example, and without limiting the scope of the invention to the details thereof.

In the drawings:

FIG. 1 is an exploded view of a compact according to the invention;

FIG. 2 is a perspective view of a closed compact;

FIG. 3 is a perspective view of an open compact;

FIG. 4 is a plan view of the middle part after molding;

FIG. 5 is a cross sectional view taken along the line V—V of FIG. 1;

FIG. 6 is a cross sectional view taken along the line VI—VI of FIG. 2; and

FIG. 7 is a cross sectional view on an enlarged scale, taken along the line VII—VII of FIG. 2.

The round compact 1 shown in FIG. 1 comprises a top 2 of a rigid material, such as polystyrene, a middle part 3 of a material approximately as rigid as polypropylene, and a bottom 2a of a material like that used for the top 2, the rings 4 and 5 of the middle part 3 being shown flat and being connected by an elastic hinge 6.

After assembly, the mirror 7 of the compact is wedged between the ring 4 and the top 2, while the powder pack 8 is held by the ring 5 on top of bottom 8a, with the aperture 9 facilitating refilling of the compact.

The completed compact is shown closed in FIG. 2 and open in FIG. 3.

The rings 4 and 5 of the middle part 3 have substantially the same height, as shown in FIG. 5. In the wall of ring 5 is a circular groove 10.

This groove 10 has at its open end a projection 11 directed toward the opposite wall of the groove.

The ring 5 has at its top a cylindrical projection 12 which is rectangular in section, with rounded edges and positioned toward the inside of ring 5 (FIG. 7).

This circular projection 12 is interrupted at 13 and 14 to the right of hinge 6.

Ring 4 is formed with a recess 15 having a projection 16 like the groove 10 and projection 11 of ring 5.

Ring 4 has near the inside of the mouth of recess 15, a circular lip 17 consisting of a rib having a flat end 18 on which the mirror 7 rests.

Around the periphery of ring 5 and flush with hinge 6 is a wall 19 of the same height as cylindrical ridge 12, so that the said ridge may seat within wall 19.

In the embodiment described, a clasp is provided to keep rings 4 and 5 in contact when closed. It consists of a tongue 21 on the ring 4 into a recess 20 in the ring 5 opposite the hinge, as shown in FIG. 6.

When the two rings 4 and 5 are in the position shown in FIG. 6, the wall 22 of hinge 6 on ring 4 (FIG. 4) comes to rest between corners 13 and 14 of the ridge 12 on the ring 5.

When the rings 4 and 5 of the middle part 3 are brought together, without having snapped the top 2 and bottom 2a in place, it is noted that the middle part 3 remains flexible, and the clasp 20–21 may be opened with very slight pressure.

The top 2 and the bottom 2a have the same shape, each having along its inner periphery a shoulder 23 which helps to center mirror 7 in the top 2 and the powder pack 8 in the bottom 2a.

Outside shoulder 23 is a ridge 24 comprising a projection 25 directed toward the rings 4 and 5, the shape of the projection being complementary to the shape of the hooked edges 11 of rings 4 and 5.

To mount top 2 and bottom 2a on the middle part 3, the ridges 24 are forced into the grooves 10 of rings 4 and 5, the walls of the said grooves spreading apart to let the hooked ends 25 of ridges 24 pass, due to the elasticity of said walls. When the hooked ends 25 have passed the hooked edges 11 of the grooves, the elasticity of the material keeps them pressed against each other in a hooked position.

It is thereafter necessary to make a significant effort to remove the ridge 24 from groove 10. When the compact is closed it will be noted that the middle part 3 has been substantially stiffened because the ridge 24 keeps rings 4 and 5 in a well defined position.

The same holds true for clasp 20–21 which forms an efficient fastening for the compact. Opening of the compact now requires an effort much greater than that required to separate the rings of the middle portion from a closed position when the top and bottom have not been mounted.

By reason of the engagement of the ridges on the top and bottom of the box in the grooves in the middle part, the latter has been made more resistant to wear and closing of the compact has been facilitated seeing to it that the walls grip more tightly.

In the above description account has been taken of the ease of manufacture of the three different components of the compact, which may thus be made in great numbers. Since the assembly of the different elements does not require the use of any tools, it may be carried out rapidly, while avoiding soiling or damaging the components during assembly.

In the embodiment just described, the compact is round, this being the usual shape for cosmetic accessories.

In another embodiment, make-up boxes may be made having for example a parallelopipedic shape and provided with shoulders and abutments capable of holding removable cosmetic containers and applicators in place.

It will of course be appreciated that the foregoing embodiment has been described purely by way of illustration and may be modified as the detail without thereby departing from the basic principles of the invention.

In particular, the device according to the invention may be used in making luggage, valises, hat boxes and suitcases. It may also be used in making containers which must be somewhat resistant and may be used for packaging goods, while protecting the contents, especially from atmospheric agents and heat.

What is claimed is:

1. A box comprising two members made of resilient material and dimensioned to register with each other to define the lateral walls of said box, said members being connected to each other by an integral web of said resilient material which acts as a hinge, and two relatively rigid plates constituting a top and a bottom for said box, each plate extending across a different one of said members to support it against compression transversely of said lateral walls, and retaining means on each plate resiliently engaged by mating means on the member which it supports to retain each plate in position thereacross.

2. A box as claimed in claim 1 in which said retaining and mating means are tongue and groove snap-fitting means.

3. A box as claimed in claim 2 in which said grooves are in said resilient members and said tongues are formed on said top and bottom plates, and serve to rigidify said members when inserted in said grooves.

4. A box as claimed in claim 1 in which said members are composed of thermoplastic material and moulded in a single step.

5. A box as claimed in claim 1 in which one of said members is formed with a slot diametrically opposite said hinge and the other member is formed with a projection which snaps into said slot to lock said members together, when they have been swung together.

6. A box as claimed in claim 1, in which said members are formed with at least one short resilient inwardly extending projection positioned to retain an article between said projection and said top or bottom.

References Cited

UNITED STATES PATENTS

| | | | |
|---|---|---|---|
| 3,256,892 | 6/1966 | Esposito | 132—83 |
| 3,117,691 | 1/1964 | Williams | 220—60 |
| 2,737,189 | 3/1956 | Morningstar et al. | 132—83 |

GEORGE T. HALL, *Primary Examiner.*

U.S. Cl. X.R.

150—.5; 132—83; 206—38